United States Patent [19]

Rhoads

[11] 4,215,392
[45] Jul. 29, 1980

[54] INVERTER POWER SUPPLY

[75] Inventor: Paul M. Rhoads, Orlando, Fla.

[73] Assignee: NCR Corporation, Dayton, Ohio

[21] Appl. No.: 971,141

[22] Filed: Dec. 19, 1978

[51] Int. Cl.² .............................................. H02M 7/00
[52] U.S. Cl. ........................................ 363/49; 363/41
[58] Field of Search ..................... 363/21, 37, 49, 97, 363/41

[56] References Cited

U.S. PATENT DOCUMENTS

| 3,602,801 | 8/1971 | Williamson | 323/17 |
| 3,736,491 | 5/1973 | Kuster | 363/97 X |
| 3,839,668 | 10/1974 | Black | 363/23 |
| 3,909,702 | 9/1975 | Hart | 323/17 |
| 4,027,228 | 5/1977 | Collins | 323/21 |
| 4,030,024 | 6/1977 | Chambers et al. | 323/17 |
| 4,032,830 | 6/1977 | Buonavita | 363/25 |
| 4,035,710 | 7/1977 | Joyce | 363/37 |
| 4,047,089 | 9/1977 | Suzuki et al. | 363/49 |
| 4,063,307 | 12/1977 | Stephens | 363/21 |
| 4,070,701 | 1/1978 | Harnden, Jr. et al. | 363/25 |
| 4,150,423 | 4/1979 | Boschert | 363/97 X |

OTHER PUBLICATIONS

IBM Technical Disclosure Bulletin, "Power Supply with Optical Isolator", A. J. Bowen, G. M. Heiling, L. T. Lemke, vol. 14, No. 11, Apr. 1972, p. 3220.
IBM Technical Disclosure Bulletin, "Inverter Start Circuit", W. S. Duspiva, vol. 17, No. 3, Aug. 1974, pp. 915-916.
"Simplifying Converter Design with a New Integrated Regulating Pulse Width Modulator", Bob Mammano, Published by Silicon General Inc., Jun. 1976, (Westminster, California).

Primary Examiner—William M. Shoop
Attorney, Agent, or Firm—J. T. Cavender; Albert L. Sessler, Jr.; Elmer Wargo

[57] ABSTRACT

A high frequency inverter power supply including a transformer having a primary and a secondary with the secondary having a first winding and a plurality of second windings to suppy D.C. output voltages to a load. Switching transistors are used to switch a current from a D.C. input means through the primary to produce an alternating voltage across the first winding and the plurality of second windings. A rectifier coupled to the first winding of the secondary supplies power to a control means which generates first and second outputs for controlling the switching transistors, respectively. A start-up circuit provides temporary power to the control means until the rectifier supplies the power after which the start-up circuit is shut off. The control means (which is essentially a pulse width modulator) has an input thereto which is coupled to one of the output voltages for regulating these voltages. A photocoupler provides isolation between secondary and primary of the transformer.

6 Claims, 6 Drawing Figures

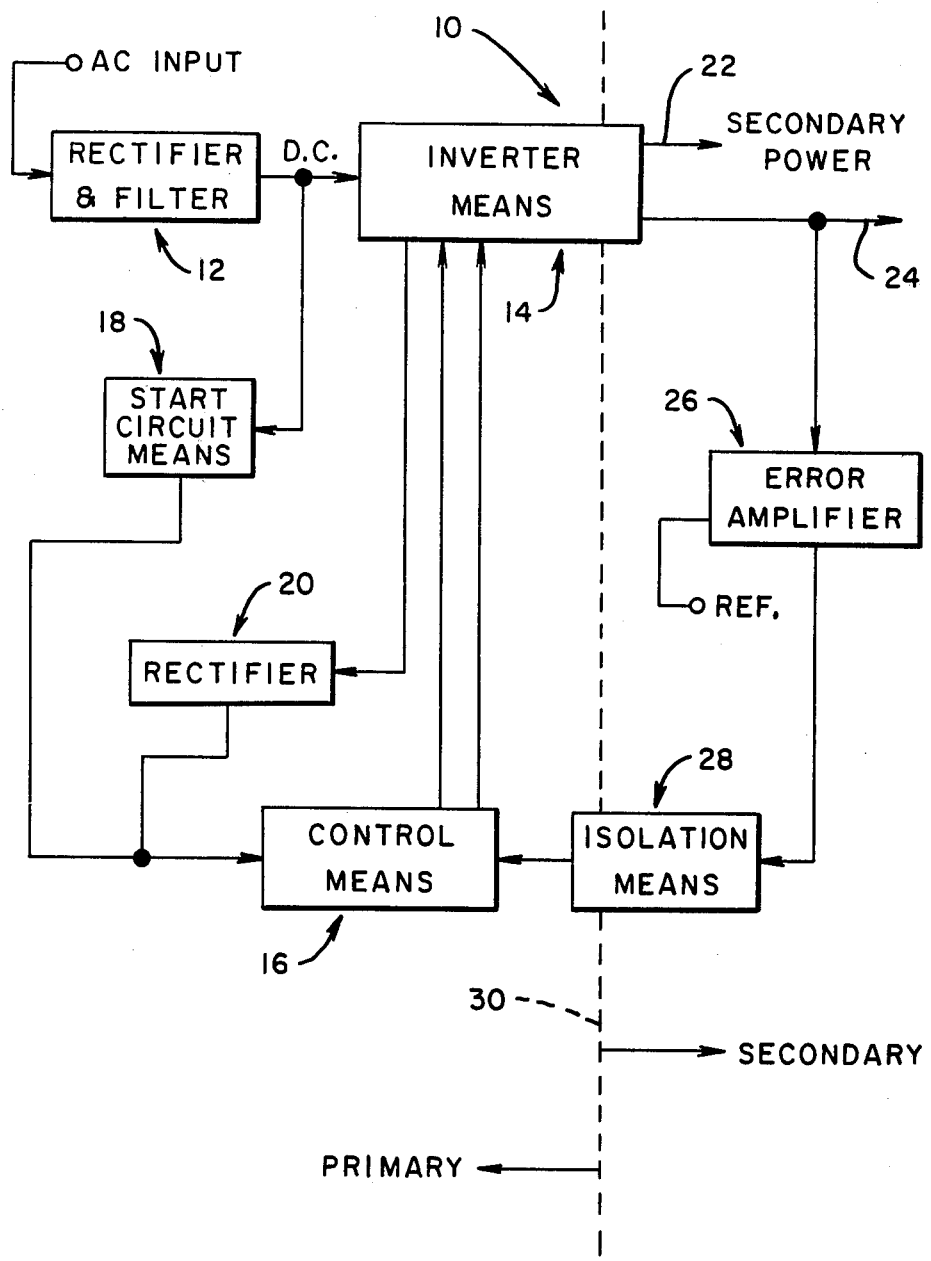

INVERTER POWER SUPPLY

BACKGROUND OF THE INVENTION

This invention relates to power supplies in general, and more particularly, it relates to regulated switching power supplies utilizing an inverter.

In recent years there has been a trend towards utilizing solid state switching devices in conjunction with high frequency transformers or magnetics for the converion of a D.C. electrical input to an A.C. output which is rectified to produce a plurality of output voltages. The advantages which may be realized through the use of high-frequency magnetics at 25–50 KHz, for example, when compared to low-frequency magnetics at 50 to 60 Hz are well known, with some of the principal advantages being size and weight savings when using the smaller and lighter transformers associated with high-frequency magnetics.

One of the problems associated with switching power supplies of the type described is that they include a control means for driving the solid state switching devices, and the control means generally requires D.C. voltages for the operation thereof. Generally, 60 Hz power transformers are utilized for supplying the D.C. voltages to the control means when the entire switching power supply is to be operated from a source of A.C. potential; the use of a 60 Hz transformer in such a situation obviously adds to the weight and cost of the power supply.

SUMMARY OF THE INVENTION

This invention relates to a regulated, switching power supply circuit. A preferred embodiment of this invention includes a transforming means having a primary and a secondary, with the secondary having a first winding and at least one second winding and with rectifying means coupled to said second winding to supply a D.C. output voltage to a load. The circuit also includes a D.C. input means and means for switching a current from the D.C. input means through the primary of the transforming means to produce an alternating voltage across the first winding and the second winding. A control means has an input thereto which is operatively coupled to the D.C. output voltage at the load and also has first and second outputs which are operatively coupled to the switching means to maintain a constant voltage at the load. A rectifier means is operatively connected to the first winding of the transforming means to provide power to the control means. Start-up means are operatively coupled to the D.C. input means to provide start-up power for the control means until the rectifier means supplies power thereto.

This invention provides an improved regulated switching power supply which is light in weight and which does not contain the low-frequency magnetics mentioned earlier herein and which minimizes the use of power dissipating components.

This invention also provides a plurality of regulated output voltages which are isolated from the primary of the transforming means.

These advantages and others will be more readily understood in connection with the following detailed description, claims and drawing.

BRIEF DESCRIPTION OF THE DRAWING

FIG. 1 is a schematic diagram, in block form of a preferred embodiment of this invention;

DETAILED DESCRIPTION OF THE INVENTION

Figure 2A:
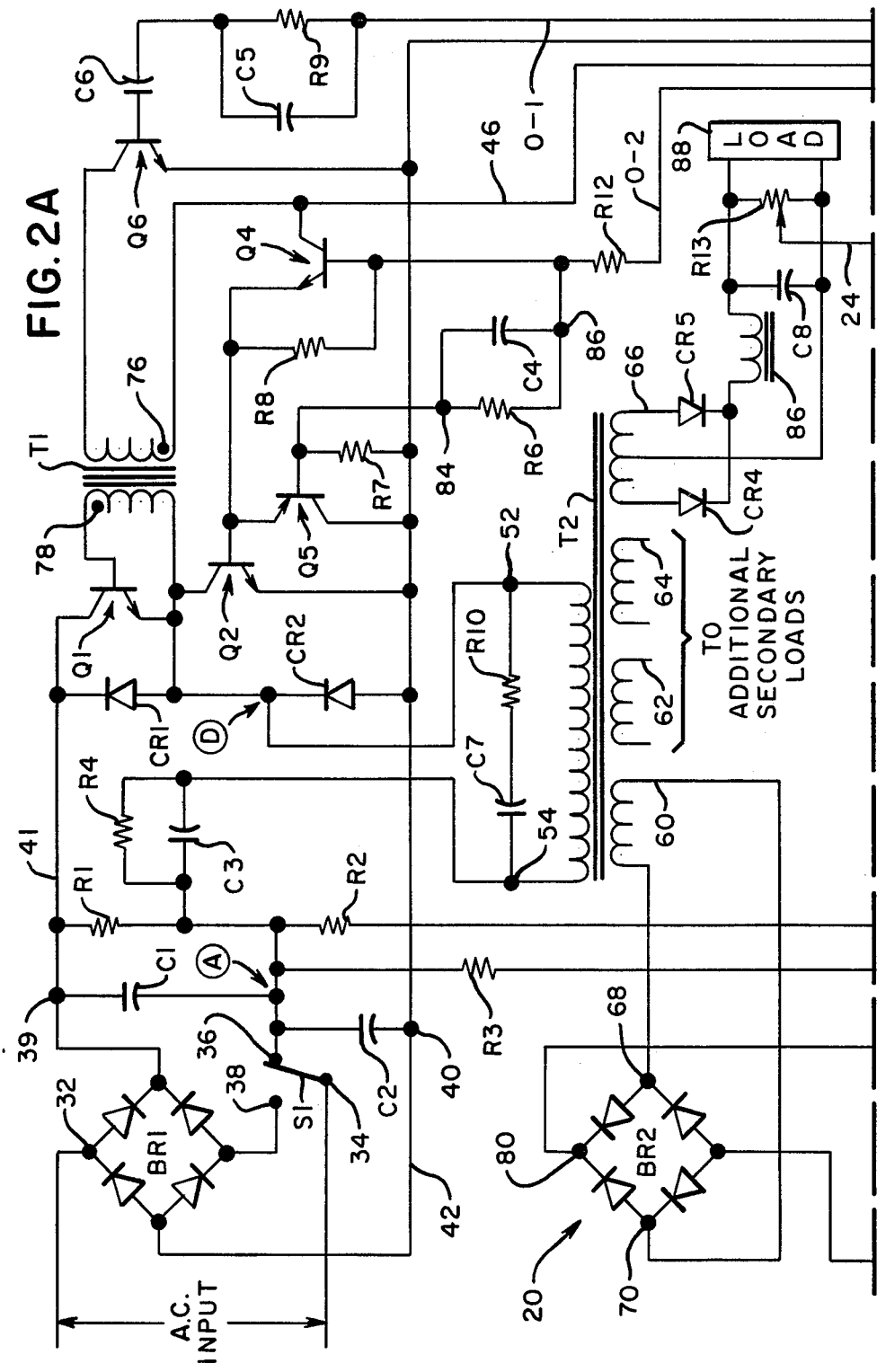
FIGS. 2A and 2B, when taken together, show a schematic diagram of the preferred embodiment shown in FIG. 1.

FIG. 1 is a schematic diagram, in block form, of a regulated power supply circuit showing a preferred embodiment of this invention which is designated generally as 10. The circuit 10 includes a rectifier and filter circuit 12 which is operatively connected to a source of A.C. input to produce a D.C. voltage at the output thereof.

The circuit 10 also includes an inverter means 14 which includes switching transistors to produce a high frequency (as for example 20 Khz) A.C. voltage which is rectified to produce a plurality of outputs shown as secondary power. A control means 16 is operatively coupled to the inverter means 14 to provide the base drives for the switching transistors included in the inverter means 14. A start circuit means 18, which is connected to the output of the rectifier and filter circuit 12, is utilized to provide start-up power for the control means 16, which in turn, gets the inverter means 14 started to produce output power. After a certain start-up time, the inverter means 14 produces output power, and a portion of this power is fed into the auxiliary rectifier 20 which provides the normal operating power to the control means 16, at which time, the start circuit means 18 is shut off.

The secondary power coming from the inverter means 14 and shown as line 22 represents a plurality of output voltages such as +5 volts, +12 volts and −12 volts, and one of these voltages (shown as line 24) is used as a control voltage which is fed back to the control means 16 via an error amplifier 26 and an isolation means 28. The control voltage on line 24 is used by the control means 16 for pulse-width modulation purposes i.e. for controlling the durations of the "on times" of the "switching transistors" included within the inverter means 14 to thereby regulate all of the secondary power coming from the inverter means 14.

The isolation means 28 is utilized to isolate the secondary and primary sides (shown by dashed line 30) of the inverter means 14 in order to satisfy certain operator safety requirements promulgated by various safety and inspection agencies such as, for example, Underwriter Laboratories.

Figure 2B:
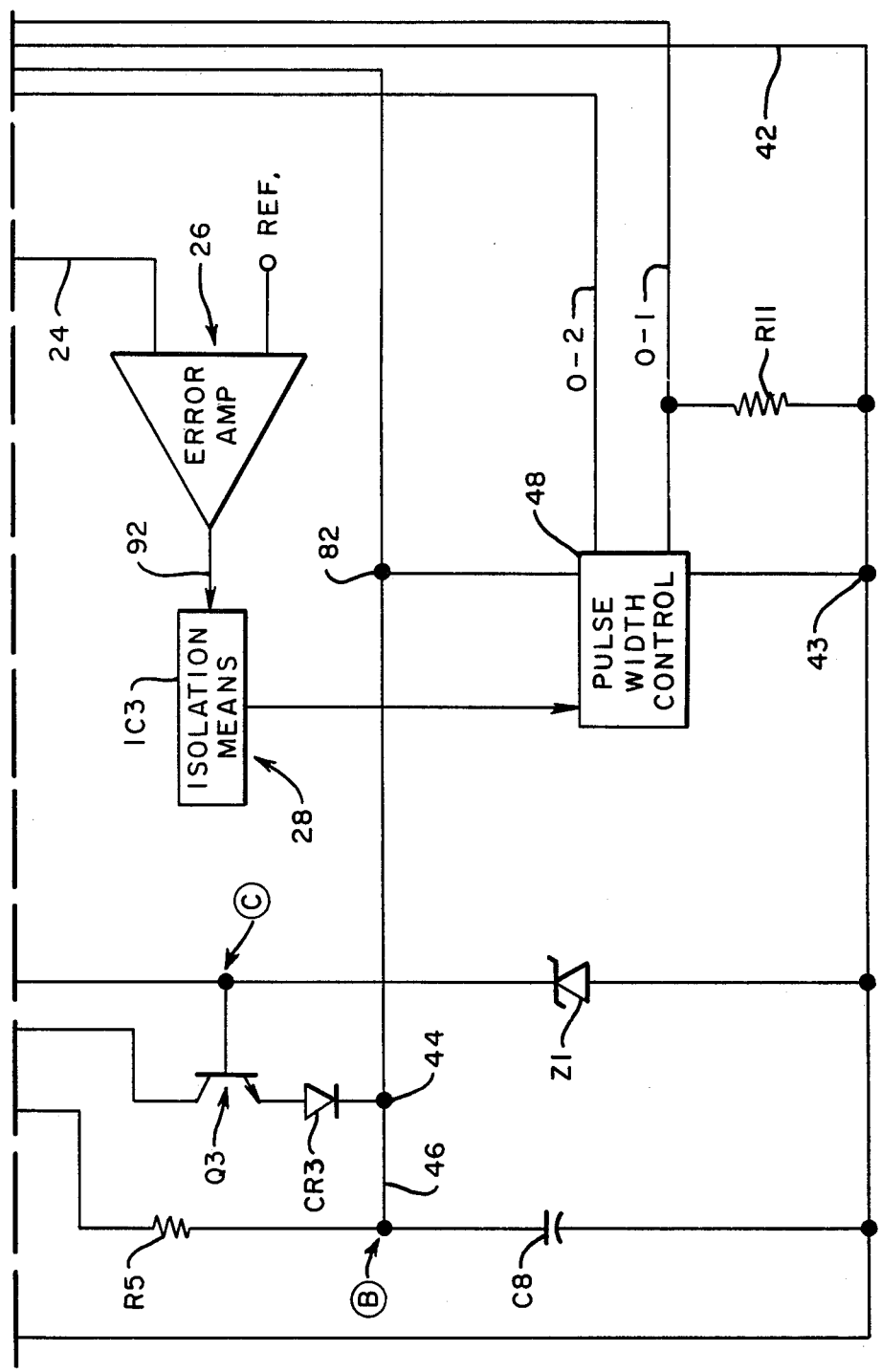

FIGS. 2A and 2B taken together show more details of the power supply circuit 10 shown in FIG. 1.

The circuit 10 (FIGS. 2A and 2B) includes a conventional diode bridge BR1 (included in rectifier and filter circuit 12 in FIG. 1) having one input terminal 32 thereof connected to one side of an A.C. input, with the remaining side of the A.C. input being connected to the input terminal 34 of a single-pole, double-throw switch S1. When the switch S1 contacts the terminal 36, the circuit 10 operates on 110 volts A.C., and when the switch S1 contacts the terminal 38, the circuit 10 may be operated from an input A.C. voltage of 220 volts, although these input voltages are merely exemplary.

When the circuit 10 operates from an input of 110 volts A.C. (FIG. 2A) and when a positive voltage appears on terminal 32, the capacitor C1 begins to charge to a peak voltage of approximately +157 volts, with the node 39 on conductor 41 being positive at this peak voltage. For the 110 volt method of operation, node A in FIG. 2A is considered to be the reference level, and the voltage level at terminal 32 swings either in a positive direction or a negative direction, depending upon the phase of the A.C. input. When terminal 32 becomes negative, capacitor C2 is charged to a negative peak voltage which means that the voltage at node 40 on conductor 42 increases to a level of approximately −157 volts with respect to node A. Thus, the voltage which is impressed across the capacitors C1 and C2 (as measured across nodes 39 and 40) is over 300 volts to provide a doubling of the input A.C. voltage applied to BR1 in the example being described. For positive half cycles of the A.C. input, capacitor C1 is charged, and for negative half cycles, capacitor C2 is charged. Node A is positive with respect to node 40, consequently, a positive voltage always appears at node A when referenced to node 40.

When the circuit 10 (FIG. 2A) is operated from an A.C. input of 220 volts, the switch S1 is switched from the position shown to electrically connect terminals 34 and 38 to thereby produce a full wave bridge rectifier, with over 300 volts being impressed across the series combination of capacitors C1 and C2. Under these conditions, node 39 is positive with respect to node 40 and node A represents the center-point voltage therebetween. Effectively, the voltage across capacitor C1 and the voltage across capacitor C2 are the same whether the diode bridge BR1 operates (as described) from an A.C. input of 110 volts or 220 volts. Conductor 42 in FIGS. 2A and 2B represents a floating reference for the circuit 10 in that conductor 42 is at approximately −157 volts with respect to natural ground.

The start circuit means 18 shown in FIG. 1 includes the resistors R2 and R3 (FIG. 2A) the transistor Q3 (FIG. 2B), the diode CR3 and the zener diode Z1. The resistor R3 is connected between the node A and the collector of transistor Q3, and the resistor R2 is connected between the node A and the base of transistor Q3 to provide a positive bias therefor. The diode CR3 is connected between the emitter of the transistor Q3 and the node 44 located on conductor 46 which conductor supplies the operating voltage to the control means 16.

During the start up of the circuit 10 (FIGS. 2A and 2B), a positive voltage is applied to the base of transistor Q3, causing it to conduct, thereby placing a positive potential at node 44 on conductor 46. The voltage at node A is about +157 volts with respect to node 40 and some voltage drop occurs across the resistor R3, and therefore, a potential of approximately 135 volts appears across the collector-emitter junction of transistor Q3, and approximately 15 volts pass through the emitter of transistor Q3 and diode CR3 to the conductor 46, as the zener diode Z1 is a 15 volt variety which limits the voltage on the base of transistor Q3 to 15 volts. The zener diode Z1 has its cathode connected to the base of transistor Q3 and its anode connected to the conductor 42. Actually, when considering the voltage drops due to the base-emitter junction of transistor Q3 and the diode CR3, the actual voltage appearing on conductor 46 in the example being described is approximately +13.5 volts. The capacitor C8 connected between the conductors 46 and 42 acts as a filter capacitor for the voltage on conductor 46.

The 13.5 volts (approximately) which appear on the conductor 46 provide the VCC voltage during start-up for the control means 16 which includes a pulse width control (PWC) integrated circuit 48 (FIG. 2B) such as an S.G. 1524 chip which is manufactured by Silicon General Corporation. The PWC circuit 48 produces first and second outputs spaced 180 degrees apart in time, with the durations of these outputs being controlled in response to a control signal fed thereto. When the second output O-2 from the PWC circuit 48 is on, for example, a positive pulse 50 (FIG. 3C) is fed into the base of transistor Q4 (FIG. 2A) causing it to conduct, thereby placing the positive potential which is on conductor 46 on to the base of transistor Q2. When a positive potential is placed on the base of transistor Q2, it, too, is rendered conductive, causing one end 52 of the primary winding of transformer T2 to be tied to conductor 42 (at approximately −157 volts) via the collector-emitter junction of transistor Q2. The remaining end 54 of the primary of transformer T2 is coupled to node A (at a ground level of 0 volts with respect to node 40) via the series-connected resistor R4 which has a capacitor C3 connected in parallel therewith. Transistors Q2 and Q1 are the switching transistors mentioned earlier herein with regard to the inverter means 14 shown in FIG. 1.

Figure 3A:
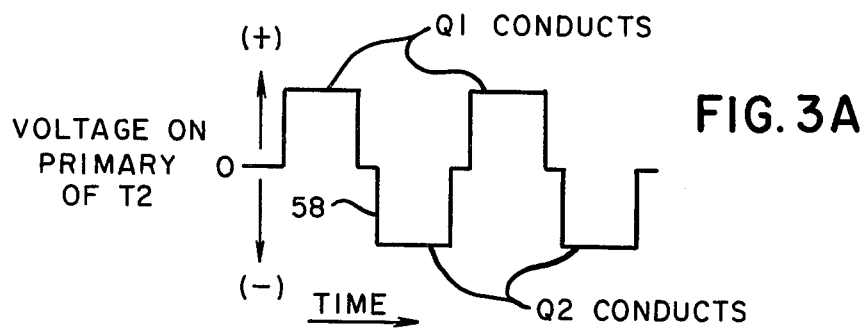
FIGS. 3A–3C show various waveshapes associated with the preferred embodiment.
Figure 3B:
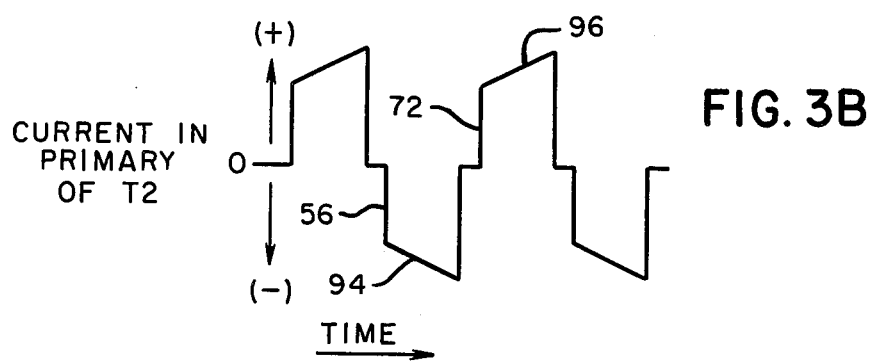

When the end 52 of transformer T2 (FIG. 2A) is tied to the conductor 42 as a result of transistor Q2 conducting, the current in the primary of T2 flows in a negative direction as shown by line 56 in FIG. 3B and the voltage on the primary of T2 (approximately 150 volts in the example being discussed) falls in a negative direction as shown by line 58 in FIG. 3A. The secondary of transformer T2 has a first winding 60 and a plurality of second windings such as 62, 64, and 66, and once the primary of transformer T2 is energized, some transformer action will commence in the secondary thereof. This transformer action in first winding 60 will cause an A.C. voltage to be applied across the terminals 68 and 70 of a conventional diode bridge BR2.

The current in the primary of transformer T2 which flows in a negative direction as represented by line 56 in FIG. 3B stays on (while transistor Q2 conducts) for about 20 microseconds, in the example being discussed, and then it is followed by a 5 microsecond delay, after which, the current in the primary flows in a positive direction as indicated by the line 72 in FIG. 3B. This current is switched in a positive direction via transistor Q1 by the output O-1 (shown at line 74 in FIG. 3C) coming from the PWC circuit 48 (FIG. 2B).

When the output O-1 from the PWC circuit 48 rises to a positive level, it places a positive drive voltage on the base of transistor Q6 (FIG. 2A) whose emitter is tied to conductor 42. One end 76 of the primary of a transformer T1 is connected to the +13.5 volts (approximately) on conductor 46, and the remaining end of the primary of transformer T1 is connected to the collector of transistor Q6. With a positive voltage on the base of transistor Q6, the transistor Q6 conducts, thereby energizing the primary of transformer T1, causing the end 78 of the secondary thereof to become positive due to transformer action. When end 78 becomes positive, the transistor Q1 conducts, causing the end 52 of the primary of transformer T2 to be connected to conductor 41 via the non-conducting, collector-emitter junction of transistor Q1, thereby placing a positive voltage (approximately 150 volts) on the primary of transformer T2. Conductor 41 is positive with respect to node A, while conductor 42 is negative with respect to node A. It is apparent that the end 52 of the primary of transformer T2 becomes positive with respect to the remaining end 54 thereof when transistor Q1 conducts, and the end 52 becomes negative with respect to end 54 when the transistor Q2 conducts. Consequently, node D in FIG. 2A alternately shifts (at a 20 Khz rate) between a −150 volts when transistor Q2 conducts and a +150 volts when transistor Q1 conducts (when operating at an A.C. input of 110 volts for example) to produce the transformer action in transformer T2, which in turn, induces A.C. voltages in the secondary thereof.

The A.C. voltage which is induced in the first winding 60 (FIG. 2A) of the secondary of transformer T2 produces an increasing positive voltage at the terminal 80 of the bridge BR2, which terminal 80 is connected to the conductor 46 (FIG. 2B) via a series connected resistor R5. As the increasing voltage from terminal 80 reaches a level of approximately 15 volts at node B (FIG. 2B) this increasing voltage back biases the diode CR3, thereby turning off the transistor Q3. Once transistor Q3 is turned off, it shuts off the start circuit means 18 (FIG. 1) and eliminates the current path passing through resistor R3 (FIG. 2A). Resistor R3 has a resistance value which causes it to consume a large amount of power when in operation; consequently, it would consume a large amount of power if continually left in operation during normal operation of the circuit 10.

A feature of the circuit 10 is that the resistor R3 (FIG. 2A) also functions as a fuse therein. In the embodiment being described, the resistor R3 is a 250 ohm, 1 watt resistor; consequently, if the transistor Q3 were to remain in the conducting state for any appreciable period of time, the resistor R3 would become overheated and fail thereby shutting off the start circuit means 18. It should be recalled that the start circuit means 18 simply provides the positive voltage necessary for "bootstrapping" the inverter means 14 into operation. Once the PWC circuit 48 starts the switching transistors Q1 and Q2 into operation as previously described, the diode bridge BR2 (included in the rectifier means 20 shown in FIG. 1) provides the necessary VCC voltage of approximately 15 volts on the conductor 46 to sustain the operation of the circuit 10. This VCC voltage is supplied to the PWC circuit 48 by a connection to conductor 46 at node 82.

Some additional discussion is necessary with regard to the switching action performed by the transistors Q1 and Q2 shown in FIG. 2A. Transistor Q2 is "direct coupled" while transistor Q1 is "transformer coupled".

The transistor Q5 (FIG. 2A) is present in the circuit 10 to accelerate the turn-off of transistor Q2 prior to transistor Q1 being turned on. In order to accelerate the turn-off of transistor Q2, it is necessary to withdraw the electrons flowing between the base and emitter thereof. This is accomplished by letting these electrons (which are stored between the base and emitter of transistor Q2) pass through the emitter-collector junction of transistor Q5. The reason that transistor Q5 does not initially prevent the transistor Q2 from conducting is that transistor Q5 is initially reverse biased when transistor Q2 is first brought into conduction via a positive voltage level on output O-2 from the PWC circuit 48. The transistor Q5 is reverse biased through a network of components including capacitor C4 and resistors R6 and R7. When a positive voltage appears on output O-2, capacitor C4 is charged with the end 84 thereof being negative with respect to the remaining end 86 which is positive. The positive charge on end 86 initially keeps the transistor Q5 reverse-biased. Once the transistor Q2 conducts, the emitter of transistor Q5 becomes negative with respect to the positive end 86 of capacitor C4. It is when end 86 falls to ground level (due to output O-2 being turned off) that end 84 of capacitor C4 becomes sufficiently negative to cause transistor Q5 to become forward biased causing the electrons stored in the base-emitter junction of transistor Q2 to be drained off to thereby accelerate the turning-off of transistor Q5. Resistor R8 is used to bleed off the electrons between the base-emitter junction of the transistor Q4 and resistor R7 is a biasing resistor for transistor Q5. R12 is present for the purpose of limiting the current coming from the PWC circuit 48.

As previously stated, the switching transistor Q1 is transformer coupled. The network of components including resistor R9, and capacitors C5 and C6 (FIG. 2A) are present for the purpose of avoiding a saturating problem with regard to the transformer T1 during initial start-up of the circuit 10. The potential saturating problem is due to the fact that the outputs O-1 and O-2 coming from the PWC circuit 48 during initial start up are, at times, too long in duration causing the transformer T1 to saturate; in effect this produces a short circuit across the primary thereof, thereby "locking up" the entire circuit 10. When the output O-1 from the PWC circuit 48 rises to a positive level, the capacitor C6 does not provide any initial barrier to turning on the transistor Q6; however, as the capacitor C6 is charged via the resistor R9 for a certain time period or constant, the transistor Q6 will be turned off by the accumulating negative charge on the base thereof. Capacitor C5 performs the function of bypassing the current limiting resistor R9 to accelerate the turn-off of transistor Q6.

The transformer coupling of transistor Q1 is utilized to facilitate the rapid turn-on and turn-off of transistor Q1. Node D in FIG. 2A falls to approximately −157 volts when transistor Q2 is turned on and this same node rises to approximately +157 volts when transistor Q1 is turned on, thereby representing a swing in potential of over 300 volts when transistor Q1 is turned on and off whereas a swing of only about 2 volts is necessary to turn transistor Q2 off since the emitter of transistor Q2 is at reference potential while the emitter-base junction of transistor Q1 must swing with the primary voltage on transformer T2. The diodes CR1 and CR2 are utilized to prevent dead time transients which occur in the transformer T2 from damaging the transistors Q1 and Q2. Normally, these diodes CR1 and CR2 are reverse biased with the cathode of CR1 being connected to the conductor 41 and its anode being connected to the node D and with the anode of CR2 being connected to the conductor 42 and its cathode being connected to the node D.

The resistors R1 and R2 (FIG. 2A) are connected across the capacitors C1 and C2, to discharge them for safety reasons and the parallel combination of resistor R4 and capacitor C3 connected between the node A and the end 54 of transformer T2 is also present for safety reasons. The network of capacitor C7 and resistor R10 which are connected in series across the primary of transformer T2 form a conventional "snubber network" for eliminating transient currents which occur in this primary.

Diodes CR4 and CR5 (FIG. 2A) along with an inductor 86 and a capacitor C8 are conventionally utilized to provide a rectified D.C. voltage to the load 88. A variable resistor R13 connected across the load 88 is utilized to set the particular output voltage at which control of the outputs of circuit 10 are to be maintained. The second windings such as 62 and 64 of the secondary of transformer T2 may be conventionally utilized to provide positive or negative output voltages; however, control for the regulation of all outputs from the secondary of transformer T2 is effected via the second winding 66.

The output voltage to be controlled at the load 88 (FIG. 2A) passes over conductor 24 to the error amplifier 26 (FIG. 2B) which is conventional such as a U. A. 723 precision regulator chip which is manufactured by Fairchild Corporation. The error amplifier 26 has its own reference potential incorporation therein and it compares the voltage on the load 88 with the reference potential to produce a linear output (92) of the proper polarity and magnitude so as to effect regulation of the load 88. The output 92 is fed into the isolation means 28 which includes a conventional isolator chip IC3 such as H 11AX 725S which is manufactured by General Electric Corp. The isolation means 28 transfers the output 92 from the error amplifier 26 to the PWC circuit 48 without an actual wire connection therebetween so as to isolate the secondary of the circuit 10 from the primary thereof and to thereby satisfy certain safety requirements mentioned earlier herein. The PWC circuit 48 has its own reference voltage level built therein so as to provide a reference level for comparing the output 92 from error amplifier 26 therewith to thereby increase the "on times" on outputs O-1 and O-2 (so as to keep the current flowing through the primary of transformer T2 for a longer time) when the voltage at the load 88 is decreasing and vice versa.

With regard to the PWC circuit 48, the output of the isolation means 28 is connected to pin 1 thereof, the output O-1 is connected to pin 11 thereof, and the output O-2 is connected to pin 14 thereof. Pins 12, 13 and 15 of the PWC circuit 48 are connected to the node 82, and pins 4, 5 and 8 thereof are connected to the conductor 42 at node 43 thereon. R11, which is series connected between the output 0-1 and conductor 42, is simply a pull-down resistor.

The isolation means 28 includes a light emitting diode and a light sensitive transistor which operates in a linear mode; however, the isolation means 28 has loose operating tolerances. Accordingly, the error amplifier 26 is conventionally utilized to "swamp out" or minimize the loose-tolerance effects of the isolation means 28.

The transformer T2 is made of powdered iron which is ceramically fused to produce the core thereof and it has fewer turns than conventional 60 cps power transformers which have a core made of iron laminations. The number of turns of the primary and secondary may be conventionally determined depending upon the input and output parameters required. The transformer T1 is similar in construction to transformer T2; however, it is much smaller in size than transformer T2. Transformers such as T1 and T2 may be obtained from R.A.F. Magnetics.

Figure 3C:
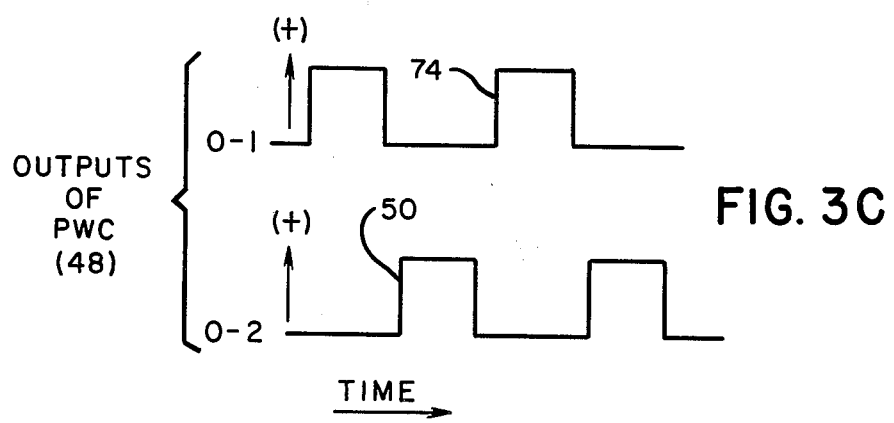

FIGS. 3A, 3B, and 3C show the relationship between the outputs of the PWC circuit 48 and the resulting currents in the primary of transformer T2 and the voltages impressed thereacross. While the current changes shown by lines 56 and 72 are shown as being erect, they occur less quickly with respect to time in actual practice. The lines shown as ramps 94 and 96 reflect the additional current which is stored in the system as the inductances which appear across the primary and the secondary of the transformer T2 charge. The swings in voltage polarity which occur when the transistors Q1 and Q2 conduct are shown in FIG. 3A.

With regard to specific components used in a preferred embodiment of the circuit 10, the following list of components not previously identified is merely illustrative:

BR1 is a conventional 25 amp, 600 volt diode bridge,
BR2 is a conventional 1 amp, 100 volt diode bridge,
R1, R2 and R4=47 K ohms
R3=250 ohms, 1 watt,
R5=10 ohms, 3 watts
R6, R7 and R12=1 K ohms,
R8=4.7 K ohms,
R9=470 ohms,
R10=51 ohms,
R11=470 ohms,
R13=100 ohms (variable),
C1 and C2=250 volts, 1700 microfarads,
C3=4 microfarads,
C4=5 microfarads,
C5=0.005 microfarads
C6=0.1 microfarads,
C7=0.001 microfarads,
C8=35 volts, 47 microfarads
Q1 and Q2=400 volts, 5 amp NPN transistors
Q3=100 volts, 1 amp NPN transistor,
Q4=100 volts, 1 amp NPN transistor,
Q5=100 volts, 1 amp PNP transistor,
CR1 and CR2=600 volts, 1 amp diodes,
CR3=100 volts, 1 amp diode,
CR4 and CR5=100 volt, 10 amp high speed rectifier diodes, and
Z1=15 volt zener diode.

What is claimed is:
1. A circuit comprising:
a transforming means having a primary and a secondary with said secondary having a first winding and at least one second winding, and also having means coupling said second winding to supply a D.C. output voltage to a load;
D.C. input means;
means operatively coupled to said D.C. input means for switching a current through said primary in response to first and second signals applied thereto to produce an alternating voltage across said first winding and said second winding;
control means having an input thereto which is operatively coupled to said D.C. output voltage and also generating said first and second signals to maintain a constant voltage at said load;
rectifier means operatively coupled to said first winding to provide power to said control means; and
start-up means operatively coupled to said D.C. input means to provide start-up power for said control means until said rectifier means supplies said power thereto; said start-up means including a resistor and a control element, said resistor being of a size which enables it to act as a fuse in the event that said control element is biased into conduction for a predetermined amount of time.

2. A power supply circuit comprising:
means for producing first and second points of opposite D.C. polarity with a third point therebetween;

a transforming means having a primary winding and a secondary, with said secondary having a first winding and at least one second winding, and also having means coupling said second winding for supplying a D.C. output voltage to a load;

said primary winding having first and second ends with said first end being coupled to said third point;

first and second switching means operatively coupled to said second end to alternately couple said second end to said first and second points to produce an alternating voltage across said first winding and said second winding;

control means having an input thereto which is operatively coupled to said D.C. output voltage and also having first and second outputs operatively coupled to said first and second switching means, respectively, to maintain a constant voltage at said load;

second rectifier means coupled to said first winding to provide power to said control means; and start-up means operatively coupled to said third point to provide start-up power to said control means and also including means for turning off said start-up means when said second rectifier means provides power to said control means.

3. The circuit as claimed in claim 2 in which said first switching means comprises a first transistor and a transformer coupled means including a transformer for biasing said first transistor into conduction in response to said first output to thereby connect said second end of said primary winding to said first point, said transformer coupled means also including means for shutting off the flow of a current through said transformer after a predetermined time period to avoid saturation of said transformer.

4. The circuit as claimed in claim 3 in which said second switching means comprises a second transistor and means for biasing said second transistor into conduction in response to said second output to thereby connect said second end of said primary winding to said second point, said biasing means also including means to accelerate the turn-off of said second transistor upon the termination of said second output.

5. The circuit as claimed in claim 3 in which said first and second points of opposite D.C. polarity are positive and negative respectively, and said third point is midway therebetween, and in which said start up means comprises a resistor and a control transistor, with said resistor being series connected between said third point said control transistor to supply said power to said control means when said control transistor is biased into conduction, said means for turning off said start-up means including a diode which is operatively coupled to said control transistor and said second rectifier means whereby said diode becomes back biased to turn off said control transistor when said rectifier means provides power to said control means.

6. A power supply circuit comprising:
means for producing first and second points of opposite D.C. polarity with a third point therebetween;
a transforming means having a primary winding and a secondary, with said secondary having a first winding and at least one second winding, and also having means coupling said second winding for supplying a D.C. output voltage to a load;

said primary winding having first and second ends with said first end being coupled to said third point;

first and second switching means operatively coupled to said second end to alternately couple said second end to said first and second points to produce an alternating voltage across said first winding and said second winding;

control means having an input thereto which is operatively coupled to said D.C. output voltage and also having first and second outputs operatively coupled to said first and second switching means, respectively, to maintain a constant voltage at said load;

second rectifier means coupled to said first winding to provide power to said control means; and start-up means operatively coupled to said third point to provide start-up power to said control means and also including means for turning off said start-up means when said second rectifier means provides power to said control means;

said circuit further comprising means coupled between said D.C. output voltage and said input to said control means for isolating said D.C. output voltage from said primary;

said first switching means comprising a first transistor and a transformer coupled means including a transformer for biasing said first transistor into conduction in response to said first output to thereby connect said second end of said primary winding to said first point, said transformer coupled means also including means for shutting off the flow of a current through said transformer after a predetermined time period to avoid saturation of said transformer;

said second switching means comprising a second transistor and means for biasing said second transistor into conduction in response to said second output to thereby connect said second end of said primary winding to said second point, said biasing means also including means to accelerate the turn-off of said second transistor upon the termination of said second output;

said first and second points of opposite D.C. polarity being positive and negative respectively, with said third point being midway therebetween;

said start-up means comprising a resistor and a control transistor, with said resistor being series connected between said third point and said control transistor to supply said power to said control means when said control transistor is biased into conduction, said means for turning off said start-up means including a diode which is operatively coupled to said control transistor and said second rectifier means whereby said diode becomes back biased to turn off said control transistor when said rectifier means provides power to said control means; and said control means comprising a pulse width modulator and said resistor is of a size which enables it to act as a fuse in the event that said control transistor is biased into conduction for a predetermined amount of time.

* * * * *